United States Patent [19]

Small, Jr. et al.

[11] Patent Number: 5,207,967
[45] Date of Patent: May 4, 1993

[54] MULTICOMPONENT POLYESTER/POLYCARBONATE BLENDS WITH IMPROVED IMPACT STRENGTH AND PROCESSABILITY

[75] Inventors: James D. Small, Jr., Blountville; Spencer A. Gilliam, Kingsport, both of Tenn.

[73] Assignee: Eastman Kodak Company, Rochester, N.Y.

[21] Appl. No.: 844,020

[22] Filed: Mar. 2, 1992

[51] Int. Cl.⁵ ............... C08L 69/00; C08L 67/02; B29C 45/73
[52] U.S. Cl. ............... 264/328.16; 524/537; 525/439; 525/444
[58] Field of Search ............... 264/328.16; 524/537; 525/439

[56] References Cited

U.S. PATENT DOCUMENTS

| | | | |
|---|---|---|---|
| 4,188,314 | 2/1980 | Fox et al. | 260/37 |
| 4,391,954 | 7/1983 | Scott | 525/439 |
| 4,786,692 | 11/1988 | Allen | 525/439 |
| 5,010,146 | 4/1991 | Kohsaka et al. | 525/439 |

FOREIGN PATENT DOCUMENTS

| | | | |
|---|---|---|---|
| 01122 | 2/1987 | World Int. Prop. O. | 525/439 |
| 09911 | 7/1991 | World Int. Prop. O. | 525/439 |

*Primary Examiner*—David J. Buttner
*Attorney, Agent, or Firm*—John D. Thallemer; William P. Heath, Jr.

[57] ABSTRACT

The present invention relates to polyester/polycarbonate blends having improved low temperature impact strength and processability. More particularly, this invention relates to a thermoplastic molding composition containing an aromatic carbonate polymer, a poly(1,4-cyclohexylenedimethylene terephthalate) (PCT) resin, and a copolyester which consists essentially of repeat units from mixtures of isophthalic acid, terephthalic acid and 1,4-cyclohexanedimethanol.

15 Claims, No Drawings

MULTICOMPONENT POLYESTER/POLYCARBONATE BLENDS WITH IMPROVED IMPACT STRENGTH AND PROCESSABILITY

FIELD OF THE INVENTION

The present invention relates to polyester/polycarbonate blends having improved low temperature impact strength and processability. More particularly, this invention relates to a thermoplastic molding composition containing an aromatic carbonate polymer, a poly(1,4-cyclohexylenedimethylene terephthalate) (PCT) resin, and a copolyester which consists essentially of repeat units from mixtures of isophthalic acid, terephthalic acid and 1,4-cyclohexanedimethanol.

BACKGROUND OF THE INVENTION

Polycarbonate is a useful engineering plastic for parts requiring clarity, toughness and heat resistance. However, polycarbonate also has deficiencies which include poor chemical and stress crack resistance, and poor processability. One method to improve these properties is to blend polycarbonate with another resin, a useful family of such resins being thermoplastic polyesters. Until now, however, such polycarbonate/polyester blends were able to increase processability only by decreasing impact strength.

Blends of polycarbonate with a copolyester derived from mixtures of isophthalic acid and terephthalic acid with 1,4 cyclohexanedimethanol are disclosed in U.S. Pat. Nos. 4,188,314 and 4,391,954. Such patents are directed to two component thermoplastic molding compositions containing an aromatic polycarbonate and a polyester resin derived from cyclohexanedimethanol and a mixture of iso- and terephthalic acids.

U.S. Pat. No. 5,010,146, is directed to a three component polyester/polycarbonate blend containing a poly(alkylene terephthalate), a polycarbonate and a polyester carbonate copolymer. The polyester carbonate copolymer is obtained by copolymerization of an alkylene terephthalate oligomer, preferably a polyethylene terephthalate oligomer, and a carbonate oligomer. The use of such oligomers is said to improve the crystallinity index of the compositions and thereby maintain such characteristics as chemical resistance without relying on the addition of other components which decrease impact resistance.

In contrast, the present invention relates to a blend comprised of a polycarbonate of 4,4'isopropylidenediphenol (bisphenol A polycarbonate), a poly(1,4-cyclohexylenedimethylene terephthalate) resin, and a copolyester which consists essentially of repeat units from mixtures of isophthalic acid, terephthalic acid and 1,4-cyclohexanedimethanol. The present inventors have unexpectedly determined that a copolyester may be incorporated into blends to increase the processability of the blends without decreasing impact strength if a polyester is added in conjunction with a copolyester. Thus, the blends of the present invention are able to achieve high impact strength without the loss of processability at low temperatures, compared to known polyester/polycarbonate blends.

SUMMARY OF THE INVENTION

Accordingly, one object of the present invention is to provide polyester/polycarbonate blends which exhibit improved low temperature impact strength and processability.

Another object of the invention is to provide polyester/polycarbonate blends which exhibit excellent mechanical properties such as impact resistance and stress crack resistance, heat resistance and transparency, and which display excellent melt flowability at the time of molding thereof, and to provide processes for preparing said blends.

These and other objects are accomplished herein by a thermoplastic composition comprising:

(A) about 10 to about 90 weight percent of an aromatic polycarbonate of 4,4'isopropylidenediphenol having a relative viscosity of about 1.1 to about 1.5;

(B) about 90 to about 10 weight percent of a poly(1,4-cyclohexylenedimethylene terephthalate) resin consisting essentially of repeat units from terephthalic acid and 1,4-cyclohexanedimethanol, based on 100 mole percent dicarboxylic acid and 100 mole percent diol, said resin having an inherent viscosity of about 0.4 to about 1.2 dl/g; and (C) about 10 to about 90 weight percent of a copolyester comprising
  (1) a dicarboxylic acid component consisting essentially of repeat units from about 1 to about 50 mole percent isophthalic acid and from about 50 to about 99 mole percent terephthalic acid, and
  (2) a diol component consisting essentially of repeat units from 1,4-cyclohexanedimethanol, based on 100 mole percent dicarboxylic acid and 100 mole percent diol; it being understood that the combined weights of (A), (B) and (C) total 100 percent.

The present invention also provides a process for injection molding a thermoplastic polyester comprising:

(I) substantially homogeneously blending (A) about 10 to about 90 weight percent of an aromatic polycarbonate of 4,4'isopropylidenediphenol having a relative viscosity of about 1.1 to about 1.5;

(B) about 90 to about 10 weight percent of a poly(1,4 cyclohexylenedimethylene terephthalate) resin consisting essentially of repeat units from terephthalic acid and 1,4 cyclohexanedimethanol, based on 100 mole percent dicarboxylic acid and 100 mole percent diol, said resin having an inherent viscosity of about 0.4 to about 1.2 dl/g; and (C) about 10 to about 90 weight percent of a copolyester comprising
  (1) a dicarboxylic acid component consisting essentially of repeat units from about 1 to about 50 mole percent isophthalic acid and from about 50 to about 99 mole percent terephthalic acid, and
  (2) a diol component consisting essentially of repeat units from 1,4-cyclohexanedimethanol, based on 100 mole percent dicarboxylic acid and 100 mole percent diol; it being understood that the combined weights of (A), (B) and (C) total 100 percent; and (II) injection molding said blend at melt temperatures of about 250° C. to about 325° C. into molds held at a temperature of about 10° C. to about 90° C.

DESCRIPTION OF THE INVENTION

The aromatic polycarbonate, component (A), used in the present invention is an aromatic polycarbonate containing 4,4'-isopropylidenediphenol (bisphenol A), as main structural units. The aromatic polycarbonate may be branched or linear and may contain small amounts of other aromatic diol component units in addition to the 4,4'-isopropylidenediphenol units. Useful aromatic diol units other than the 4,4'-isopropylidenediphenol units include, 2,2-bis(4-hydroxyphenyl)propane, bis(4-hydroxyphenyl)methane, 1,1-bis(4-hydroxyphenyl)cyclohexane, bis(4-hydroxyphenyl)thioether, bis(4-hydroxyphenyl)sulfone and 4,4'-dihydroxybiphenyl.

The above mentioned polycarbonate, component (A), may contain small amounts of aliphatic diol component units in addition to the aromatic diol component units. Useful aliphatic diol component units include, for example, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

In addition to the aromatic diol component units and aliphatic diol component units mentioned above, the polycarbonate may contain small amounts of polyfunctional compound component units. Useful polyfunctional compound component units include, for example, aromatic polyols such as phloroglucin and 1,2,4,5,-tetrahydroxybenzene; aliphatic polyols such as glycerin, trimethylolethane, trimethylolpropane and pentaerythritol; aromatic polybasic acids such as trimellitic acid, trimesic acid and 3,3',5,5'-tetracarboxydiphenyl; aliphatic polybasic acids such as butanetetracarboxylic acid; and oxypolycarboxylic acids such as tartaric acid and malic acid.

In the above mentioned carbonate polymer, the 4,4'isopropylidenediphenol component units are present in an amount of 95 to 100 mole percent, more preferably 98 to 100 mole percent. The aromatic diol component units other than the 4,4'isopropylidenediphenol component units are present in an amount of 0 to 5 mole percent, more preferably 0 to 2 mole percent.

The aromatic polycarbonate, component (A), has a relative viscosity (R.V.) value of 1.1 to 1.5, preferably 1.2 to 1.4, as measured at 25° C. using 0.50 grams of the polycarbonate per 100 mL of methylene chloride.

The aromatic polycarbonate may be prepared in the melt, in solution, or by interfacial polymerization techniques well known in the art. For example, the aromatic polycarbonates can be made by reacting bisphenol-A with phosgene, dibutyl carbonate or diphenyl carbonate. Such aromatic polycarbonates are also commercially available.

The second component of the present invention is a poly(1,4-cyclohexylenedimethylene terephthalate) resin consisting essentially of repeat units from terephthalic acid and 1,4-cyclohexanedimethanol, based on 100 mole percent dicarboxylic acid and 100 mole percent diol. The term "consisting essentially of" means that in addition to the terephthalic acid and 1,4-cyclohexanedimethanol, other dicarboxylic acids and diols may be present in the poly(1,4-cyclohexylenedimethylene terephthalate) resin provided that the basic and essential characteristics of the resin are not materially affected thereby.

Poly(1,4-cyclohexylenedimethylene terephthalate) resins useful as component (B) have an inherent viscosity of about 0.4 to about 1.2 dl/g. Preferably, the resins have an inherent viscosity of 0.55 to 0.85 dl/g. These resins are commercially available or may be prepared by processes well known in the art. For example, the resins can be prepared by direct condensation of terephthalic acid or ester interchange using dimethyl terephthalate with 1,4-cyclohexanedimethanol.

The third component of the present invention is a copolyester which contains repeat units from mixtures of isophthalic acid, terephthalic acid and 1,4-cyclohexanedimethanol, based on 100 mole percent dicarboxylic acid and 100 mole percent diol. The dicarboxylic acid component of the copolyester (C) consists essentially of repeat units from about 1 to about 50 mole percent isophthalic acid and from about 50 to about 99 mole percent terephthalic acid. Preferably, the acid portion consists of 1 to 25 weight percent isophthalic acid and 75 to 99 weight percent terephthalic acid. The diol component of the copolyester (C) consists essentially of repeat units from 1,4-cyclohexanedimethanol. The term "consists essentially of" means that in addition to the isophthalic acid, terephthalic acid, and 1,4-cyclohexanedimethanol, other dicarboxylic acids and diols may be present in the copolyester provided that the basic and essential characteristics of the copolyester are not materially affected thereby.

Copolyesters useful as component (C) have an inherent viscosity (I.V.) of about 0.4 to about 1.2 dl/g. Preferably, the copolyesters have an inherent viscosity of 0.55 to 0.85 dl/g.

The polyesters and copolyesters useful in the invention can be prepared by conventional polycondensation procedures well-known in the art. Such processes include direct condensation of the acid with the glycol or by ester interchange using lower alkyl esters. The essential components of the polyester and copolyesters; e.g., terephthalic acid or dimethyl terephthalate, isophthalic acid or dimethyl isophthalate and 1,4-cyclohexanedimethanol, are commercially available.

It is important to note that residual catalyst used in forming the polyester, component (B), and the copolyester, component (C), may act as a catalyst for ester-carbonate interchange. The fact that polyesters and polycarbonates can undergo ester-carbonate interchange is well known and such copolymeric reaction products, component (D), are included within the scope of this invention. The term "copolymeric reaction products" is taken to include any products formed by a method of forming copolymers of the poly(1,4-cyclohexylenedimethylene terephthalate) resin, component (B), the copolyester, component (C), and the aromatic polycarbonate, component (A), such as in-situ transesterification, transesterification in a separate step, or direct copolymerization of the monomers, and the like.

Deactivation of the residual catalyst and thus inhibition of the transesterification reaction products may be achieved by the addition of metal deactivators such as p-phenylenediamines to the system. Deactivation of the residual metal catalyst present in the polyesters hinders the reactions that are required to form the copolymeric reaction products. While the copolymeric reaction products, component (D), are not essential to the present invention, improvements in mechanical properties may be achieved through the use of such copolymeric reaction products. Thus, multicomponent blends of an aromatic polycarbonate, a poly(1,4-cyclohexylenedimethylene terephthalate) resin, a copolyester and copolymeric products formed from a reaction between the esters and polycarbonate, are included within the present invention.

Many other ingredients can be added to the compositions of the present invention to enhance the performance properties of the blends. For example, reinforcing agents, impact modifiers, antioxidants, metal deactivators, colorants, phosphate stabilizers, mold release agents, fillers, nucleating agents, ultraviolet light and heat stabilizers, lubricants, flame retardants and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

The mechanical properties exhibited by the resin compositions of the present invention may be improved by incorporation of from about 10 to about 50 percent, based on the weight of the total composition, of a reinforcing material. The preferred reinforcing material is glass fibers. Glass fibers suitable for use in the present invention may be in the form of filaments, threads, fibers, or whiskers. Substantially any of the types of glass fibers generally known and/or used in the art are useful in the present invention. For purposes such as the reduction of warpage of molded parts, the PCT resin may be reinforced with a mixture of glass fibers and a plate-like filler such as mica. Other reinforcing materials such a carbon filaments, silicates, mica, clay, talc, titanium dioxide, Wollastanite, glass flakes, glass beads, polymeric fibers, metal fibers, graphite fibers, aramid fibers, aluminum silicate, asbestos and the like may be used in combination with, or in place of the glass fibers.

Other desirable additives include antioxidants and impact modifiers. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts of from 0.1 to 25 weight percent of the overall composition and preferably in amounts from 0.1 to 10 weight percent of the composition.

Flame retardants may also be included as an additive in the present invention. A preferred flame retardant is a mixture which contains an aromatic organic compound having at least one aromatic ring having halogen bonded directly to the aromatic ring. Representative of such flame retardant compounds are decabromodiphenyl ether, octabromodiphenyl ether, ethylene bis(tetrabromophthalimide), brominated polystyrene, poly(dibromophenylene oxide), a condensation product of two moles of tetrachlorocyclopentadiene and one mole of cyclooctadiene, and the like. The flame retarding mixture further contains an antimony compound such as antimony oxide, antimony trioxide, sodium antimonate and powdered antimony.

The process for preparing the polyester/polycarbonate blends of the present invention involve preparing the aromatic carbonate polymer, poly(1,4-cyclohexylenedimethylene terephthalate) resin, and copolyester, respectively, by processes as mentioned previously. The components are dried in an atmosphere of dried air or dried nitrogen, or under reduced pressure. The components are mixed and subsequently melt compounded, for example, in a single or twin screw extruder. Melt temperatures typically will be in the range of 275°-315° C.; it is desirable that the melt temperature not exceed 325° C. After completion of the melt compounding, the extrudate is withdrawn in strand form, and recovered according to the usual way such as cutting.

The range of composition of the blends is from about 10 to about 90 weight percent aromatic polycarbonate, about 90 to about 10 weight percent poly(1,4-cyclohexylenedimethylene terephthalate) resin, and from about 10 to about 90 weight percent copolyester. The preferred compositional range is from 25 to 75 weight percent aromatic polycarbonate, from 75 to 25 weight percent poly(1,4 cyclohexylenedimethylene terephthalate) resin, and from 25 to 75 weight percent copolyester.

The blends of this invention serve as excellent starting materials for the production of moldings of all types by injection molding. Moreover, in their unmodified form, the blends of this invention are clear. This, combined with their excellent impact strengths, make them useful in ophthalmic and safety shield applications. Additional applications include medical parts, appliance parts, housings, recreational and utility parts. The molding compositions of the present invention are especially useful in applications that require toughness in hard to fill injection molded parts.

The materials and testing procedures used for the results shown herein are as follows:

The aromatic polycarbonate, component (A), used in the examples was a polycarbonate of 4,4'isopropylidenediphenol (bisphenol A polycarbonate) which is available from Miles, Inc.

The Polyester, component (B), used in the examples consisted of 100 mole percent terephthalic acid and 100 mole percent 1,4-cyclohexanedimethanol.

The following copolyesters, component (C), were used in the examples:

Copolyester I consisted of about 80 mole percent terephthalic acid, about 20 mole percent isophthalic acid, and 100 mole percent 1,4-cyclohexanedimethanol.

Copolyester II consisted of about 95 mole percent terephthalic acid, about 5 mole percent isophthalic acid, and 100 mole percent 1,4-cyclohexanedimethanol.

The following test methods were employed:

Inherent viscosity (I.V.) was measured at 25° C. using 0.50 grams of polymer per 100 mL of a solvent consisting of 60% by weight phenol and 40% by weight tetrachloroethane.

Relative viscosity (R.V.) was measured at 25° C. using 0.50 g of polymer per 100 mL of a solvent consisting of methylene chloride.

Dynamic viscosity was determined by small amplitude oscillatory shear methods using a Rheometrics RMS 800 Mechanical Spectrometer employing a parallel disk geometry and operating in the dynamic mode at a temperature of 290° C. The plate radii were 12.5 mm, and the gap between plates was 1.0 mm.

Flexural Modulus: ASTM D790
Flexural Strength: ASTM D790
Tensile Strength: ASTM D638
Elongation: ASTM D638
Izod Impact Strength: ASTM D256
Heat Distortion Temperature (HDT): ASTM D648.

The invention will be further illustrated by a consideration of the following examples, which are intended to be exemplary of the invention. All parts and percentages in the examples are on a weight basis unless otherwise stated.

EXAMPLES 1-15

A pellet mixture containing the Polyester and the polycarbonate of 4,4'isopropylidenediphenol was prepared and dried at 120° C. for 16 hours in −40° C. dewpoint air. Separately, Copolyester I and II pellets were dried at 70° C. for 16 hours in −40° C. dewpoint air. The dried pellets were mixed to yield the various blend compositions of Examples 1-15 which are listed in Table I. Examples 1 and 5 are two component blends which are used as comparison examples. The compositions were melt blended using a 1.25 inch (3.21 cm) Sterling single screw extruder (L/D=30/1) at a set temperature of 305° C. The extrudate was chopped into pellets which were dried at 90° C. for 16 hours in −40° C. dewpoint air, and injection molded into tensile and flexural bars using a Toyo 90 ton injection molding machine having a mold cavity temperature of 23° C. The test results are summarized in Tables I and III.

The results in Table I clearly show that the blends of the present invention exhibit lower dynamic viscosity values indicating greater processability while maintaining higher impact strength, than the comparison Examples 1, 5 and 23. Examples 1 and 5 illustrate two component polyester/polycarbonate blends. Example 23 is a comparison example which sets forth the impact strength of polycarbonate. The impact strength of Example 1 approaches that of the polycarbonate, however, the dynamic viscosity of Example 1 is very high indicating poor processability. Example 5, on the other hand, exhibits very low impact strength but good dynamic viscosity. Thus, it appears that the addition of a copolyester increases the processability of polycarbonate at the expense of low temperature impact strength. The present inventors, however, have unexpectedly determined that a copolyester may be incorporated into polycarbonate to increase the processability without decreasing impact strength if a polyester is added in conjunction with the copolyester. Consequently, the blends of the present invention are able to achieve high impact strength without the loss of processability at low temperatures, compared to known polyester/polycarbonate blends.

The results in Table III clearly show that the mechanical properties of the blends of the present invention are not compromised with the increase in impact strength and processability.

EXAMPLES 16-22

Blends were prepared and molded as in Examples 1-15, except that 0.25% by weight of di(stearyl)pentaerythritoldiphosphite, which is a stabilizer available from General Electric Specialty Chemicals under the trade name Weston 619, was added to the predried mixture of each composition prior to the extrusion process. Examples 16 and 20 are two component blends which are used as comparison examples. The test results are summarized in Tables II and III.

The results in Table II clearly show that the blends of the present invention, even with additives, exhibit lower dynamic viscosity values indicating greater processability while maintaining higher impact strength, than the comparison blends of Examples 16 and 20. Thus, the blends of the present invention are able to achieve higher impact strength without the loss of processability.

The results in Table III clearly show that the mechanical properties of the blends of the present invention, even with additives, are maintained along with the increase in impact strength and processability.

EXAMPLE 23

Makrolon 2608 polycarbonate which is available from Miles, Inc., was dried at 120° C. for 16 hours in −40° C. dewpoint air and injection molded as in Examples 1-15. The test results are summarized in Table I.

TABLE I

| Ex. | PE | CoPE I | CoPE II | PC | Unnotched IZOD Impact strength @ −40° C. (ft-lb/inch) | Dynamic Viscosity @ 10 rad/sec and 290° C. (Poise) |
|---|---|---|---|---|---|---|
| 1 | 50 | 0 | 0 | 50 | 63.5 | 4670 |
| 2 | 40 | 10 | 0 | 50 | 61.7 | 4615 |
| 3 | 25 | 25 | 0 | 50 | 61.5 | 3577 |
| 4 | 10 | 40 | 0 | 50 | 40.7 | 3161 |
| 5 | 0 | 50 | 0 | 50 | 18.4 | 3505 |
| 6 | 33.3 | 33.3 | 0 | 33.3 | 51.8 | |
| 7 | 30 | 30 | 0 | 40 | 56.5 | |
| 8 | 20 | 5 | 0 | 75 | 45.6 | |
| 9 | 5 | 20 | 0 | 75 | 39.8 | |
| 10 | 60 | 15 | 0 | 25 | 42.0 | |
| 11 | 15 | 60 | 0 | 25 | 54.9 | |
| 12 | 20 | 0 | 5 | 75 | 56.5 | |
| 13 | 5 | 0 | 20 | 75 | 58.0 | |
| 14 | 60 | 0 | 15 | 25 | 53.2 | |
| 15 | 15 | 0 | 60 | 25 | 56.4 | |
| 23 | 0 | 0 | 0 | 100 | 65.0 | |

PE denotes the Polyester.
CoPE I and II denotes the respective Copolyester.
PC denotes Polycarbonate.

TABLE II

| Ex. | PE | CoPE I | CoPE II | PC | Unnotched IZOD Impact strength @ −40° C. (ft-lb/inch) | Dynamic Viscosity @ 10 rad/sec and 290° C. (Poise) |
|---|---|---|---|---|---|---|
| 16 | 50 | 0 | 0 | 50 | 39.0 | 6340 |
| 17 | 40 | 10 | 0 | 50 | 31.7 | 3737 |
| 18 | 25 | 25 | 0 | 50 | 32.5 | 3563 |

TABLE II-continued

| Ex. | PE | CoPE I | CoPE II | PC | Unnotched IZOD Impact strength @ −40° C. (ft-lb/inch) | Dynamic Viscosity @ 10 rad/sec and 290° C. (Poise) |
|---|---|---|---|---|---|---|
| 19 | 10 | 40 | 0 | 50 | 20.8 | 2953 |
| 20 | 0 | 50 | 0 | 50 | 9.8 | 2847 |
| 21 | 33.3 | 33.3 | 0 | 33.3 | 58.5 | |
| 22 | 30 | 30 | 0 | 40 | 41.3 | |

PE denotes the Polyester.
CoPE I and II denotes the respective Copolyester.
PC denotes Polycarbonate.

TABLE III

| Example | Tensile Strength at Yield (psi) | Tensile Strength at Break (psi) | Elongation at Break (%) | Flexural Strength (psi) | Flexural Modulus (psi) | HDT at 66 psi (°C.) |
|---|---|---|---|---|---|---|
| 1 | 7820 | 8050 | 124 | 11,100 | 300,000 | 111 |
| 2 | 7890 | 8520 | 143 | 11,400 | 304,000 | 109 |
| 3 | 7930 | 8990 | 174 | 11,500 | 314,000 | 108 |
| 4 | 8080 | 8540 | 151 | 11,600 | 313,000 | 104 |
| 5 | 8050 | 8090 | 141 | 11,700 | 319,000 | 105 |
| 6 | 7360 | 8110 | 184 | 10,500 | 282,000 | 99 |
| 7 | 7560 | 8340 | 172 | 10,900 | 298,000 | 101 |
| 8 | 8730 | 9000 | 115 | 12,600 | 330,000 | 119 |
| 9 | 8830 | 8470 | 82 | 12,700 | 344,000 | 120 |
| 10 | 6980 | 7330 | 166 | 9,700 | 265,000 | 92 |
| 11 | 7160 | 7440 | 191 | 9,850 | 271,000 | 91 |
| 12 | 8610 | 8900 | 113 | 12,500 | 327,000 | 119 |
| 13 | 8630 | 9160 | 119 | 12,600 | 330,000 | 122 |
| 14 | 6840 | 7070 | 146 | 9,710 | 259,000 | 91 |
| 15 | 6850 | 7960 | 198 | 9,640 | 262,000 | 93 |
| 16 | 7940 | 7460 | 103 | 11,300 | 313,000 | 110 |
| 17 | 7900 | 8060 | 126 | 11,300 | 306,000 | 110 |
| 18 | 8000 | 8660 | 152 | 11,500 | 312,000 | 102 |
| 19 | 7980 | 8590 | 158 | 11,600 | 325,000 | 105 |
| 20 | 8180 | 8370 | 147 | 11,700 | 316,000 | 101 |
| 21 | 7400 | 7940 | 170 | 10,600 | 286,000 | 96 |
| 22 | 7600 | 7850 | 150 | 10,900 | 293,000 | 100 |

Many variations will suggest themselves to those skilled in this art in light of the above detailed description. All such obvious modifications are within the full intended scope of the appended claims.

What is claimed is:

1. A thermoplastic molding composition comprising:
   (A) about 10 to about 90 weight percent of an aromatic polycarbonate of 4,4'isopropylidenediphenol having a relative viscosity of about 1.1 to about 1.5;
   (B) about 90 to about 10 weight percent of a poly(1,4-cyclohexylenedimethylene terephthalate) resin consisting essentially of repeat units from terephthalic acid and 1,4-cyclohexanedimethanol, based on 100 mole percent dicarboxylic acid and 100 mole percent diol, said resin having an inherent viscosity of about 0.4 to about 1.2 dl/g; and
   (C) about 10 to about 90 weight percent of a copolyester comprising
      (1) a dicarboxylic acid component consisting essentially of repeat units from about 1 to about 50 mole percent isophthalic acid and from about 50 to about 99 mole percent terephthalic acid, and
      (2) a diol component consisting essentially of repeat units from 1,4-cyclohexanedimethanol, based on 100 mole percent dicarboxylic acid and 100 mole percent diol;
   it being understood that the combined weights of (A), (B) and (C) total 100 percent.

2. A thermoplastic molding composition comprising:
   (A) about 10 to about 90 weight percent of an aromatic polycarbonate of 4,4'isopropylidenediphenol having a relative viscosity of about 1.1 to about 1.5;
   (B) about 90 to about 10 weight percent of a poly(1,4-cyclohexylenedimethylene terephthalate) resin consisting essentially of repeat units from terephthalic acid and 1,4-cyclohexanedimethanol, based on 100 mole percent dicarboxylic acid and 100 mole percent diol, said resin having an inherent viscosity of about 0.4 to about 1.2 dl/g;
   (C) about 10 to about 90 weight percent of a copolyester comprising
      (1) a dicarboxylic acid component consisting essentially of repeat units from about 1 to about 50 mole percent isophthalic acid and from about 50 to about 99 mole percent terephthalic acid, and
      (2) a diol component consisting essentially of repeat units from 1,4-cyclohexanedimethanol, based on 100 mole percent dicarboxylic acid and 100 mole percent diol; and
   (D) about 0.05 to about 50 weight percent of copolymeric reaction products of (A), (B) and (C); it being understood that the combined weights of (A), (B), (C) and (D) total 100 percent.

3. The composition according to claim 1 wherein the aromatic polycarbonate, component (A), is present in an amount of from 25 to 75 weight percent, the poly(1,4-cyclohexylenedimethylene terephthalate) resin, component (B), is present in an amount of from 75 to 25 weight percent, and the copolyester, component (C), is present in an amount of from 25 to 75 weight percent based on the total weight of the composition.

4. The composition according to claim 1 wherein the poly(1,4-cyclohexylenedimethylene terephthalate) resin, component (B), has an inherent viscosity of 0.55 to 0.85 dl/g.

5. The composition according to claim 1 wherein the copolyester, component (C), has an inherent viscosity of about 0.4 to about 1.2 dl/g.

6. The composition according to claim 5 wherein the copolyester, component (C), has an inherent viscosity of 0.55 to 0.85 dl/g.

7. The composition according to claim 1 wherein the copolyester, component (C), contains repeat units from 1 to 25 mole percent isophthalic acid and 75 to 99 mole percent terephthalic acid, and 100 mole percent 1,4-cyclohexanedimethanol based on 100 mole percent dicarboxylic acid and 100 mole percent diol.

8. A thermoplastic molding composition produced by mixing in the presence of an active esterification catalyst
   (A) about 10 to about 90 weight percent of an aromatic polycarbonate of 4,4'isopropylidenediphenol having a relative viscosity of about 1.1 to about 1.5;

(B) about 90 to about 10 weight percent of a poly(1,4-cyclohexylenedimethylene terephthalate) resin consisting essentially of repeat units from terephthalic acid and 1,4-cyclohexanedimethanol, based on 100 mole percent dicarboxylic acid and 100 mole percent diol, said resin having an inherent viscosity of about 0.4 to about 1.2 dl/g; and (C) about 10 to about 90 weight percent of a copolyester comprising
   (1) a dicarboxylic acid component consisting essentially of repeat units from about 1 to about 50 mole percent isophthalic acid and from about 50 to about 99 mole percent terephthalic acid, and
   (2) a diol component consisting essentially of repeat units from 1,4-cyclohexanedimethanol, based on 100 mole percent dicarboxylic acid and 100 mole percent diol; under reaction conditions such that transesterification occurs to the extent that from about 0.05 to about 50 weight percent of the polyester moieties are chemically reacted with a polycarbonate moiety.

9. The composition according to claim 1 which additionally contains up to about 50 weight percent of a reinforcing material.

10. The composition according to claim 9 wherein glass fibers are used as said reinforcing material.

11. The composition according to claim 1, further comprising an additive selected from the group consisting of colorants, impact modifiers, mold release agents, antioxidants, tougheners, nucleating agents, ultraviolet light and heat stabilizers, lubricants, and processing aids.

12. A molded article comprising the composition of claim 1.

13. A molded article comprising the composition of claim 2.

14. A process for injection molding a thermoplastic polyester comprising
   (I) substantially homogeneously blending
   (A) about 10 to about 90 weight percent of an aromatic polycarbonate of 4,4'isopropylidenediphenol having a relative viscosity of about 1.1 to about 1.5;
   (B) about 90 to about 10 weight percent of a poly(1,4-cyclohexylenedimethylene terephthalate) resin consisting essentially of repeat units from terephthalic acid and 1,4-cyclohexanedimethanol, based on 100 mole percent dicarboxylic acid and 100 mole percent diol, said resin having an inherent viscosity of about 0.4 to about 1.2 dl/g; and
   (C) about 10 to about 90 weight percent of a copolyester comprising
      (1) a dicarboxylic acid component consisting essentially of repeat units from about 1 to about 50 mole percent isophthalic acid and from about 50 to about 99 mole percent terephthalic acid, and
      (2) a diol component consisting essentially of repeat units from 1,4-cyclohexanedimethanol, based on 100 mole percent dicarboxylic acid and 100 mole percent diol;
it being understood that the combined weights of (A), (B) and (C) total 100 percent; and
   (II) injection molding said blend at melt temperatures of about 250° C. to about 325° C. into molds held at a temperature of about 10° C. to about 90° C.

15. The product of the process of claim 14.

* * * * *